July 30, 1968

J. A. MISCOVICH 3,394,917

VALVE

Filed Feb. 2, 1966

INVENTOR.
JOHN A. MISCOVICH

BY
ATTORNEY

July 30, 1968    J. A. MISCOVICH    3,394,917
VALVE

Filed Feb. 2, 1966    2 Sheets-Sheet 2

INVENTOR.
JOHN A. MISCOVICH
BY
ATTORNEYS

United States Patent Office 3,394,917
Patented July 30, 1968

3,394,917
VALVE
John A. Miscovich, Flat, Alaska, assignor to John W. Stang Corporation, Orange, Calif., a corporation of New York
Filed Feb. 2, 1966, Ser. No. 524,621
7 Claims. (Cl. 251—347)

The present invention relates to valves, and more particularly to valves of the type in which the valve head position with respect to the valve seat is adjustable, whereby the flow of fluid through the valve may be varied, i.e., controlled as to amount or cut off completely.

In the fluid-handling arts, e.g., fire-fighting systems, irrigation systems, and petroleum-handling and refining systems, there has long existed a need for simple, compact valves not considerably larger in diameter than the conduits in which they are employed, and particularly for such valves characterized by low operating torques such that they may be manually actuated with ease, or mechanically actuated, for instance in remote control installations, by relatively low power drive means.

Further, it is desirable in some of these arts that valves be provided which also function as swivel joints.

Thus, it is an object of the present invention to provide a valve adapted to be mounted substantially coaxially with conduit means with which it coacts, and to be actuated by rotating its body about the axis of the conduit means.

It is another object of the present invention to provide such a valve having an outer contour which is substantially a figure of rotation the axis of which coincides with the axis of its associated conduit means.

It is another object of the present invention to provide a valve the maximum diameter of which may be less than twice the outside diameter of its associated conduit.

It is another object of the present invention to provide such a valve characterized by sufficiently low operating torque that it may be operated manually.

It is another object of the present invention to provide a valve which is also capable of functioning as a swivel joint.

It is another object of the present invention to provide such a valve characterized by sufficiently low operating torque that it may be mechanically operated, for example, in remote control applications, by drive means of relatively low power.

These and other objects will become apparent from the following detailed description taken in connection with the accompanying drawing in which.

Figure 1:
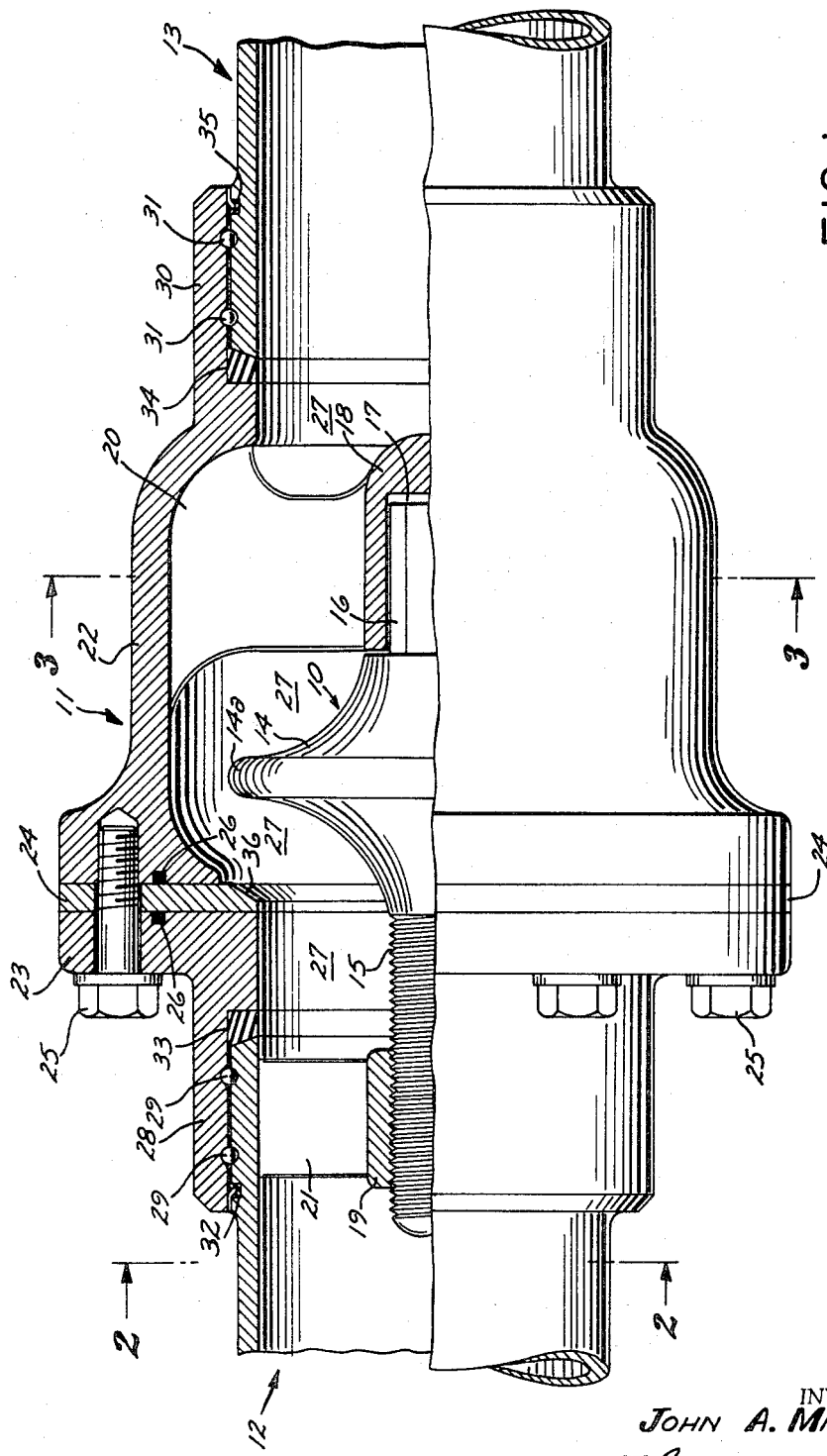
FIGURE 1 is a view, partially in side elevation and partially in longitudinal central section, showing a valve according to the present invention, in its open condition.

Referring now to the drawings, which illustrate the structure of one embodiment of the present invention, it may be seen that the invention generally comprises translatable member 10 and a plurality of fluid-conveying members, said plurality of fluid-conveying members consisting of actuator assembly 11 and conduits 12 and 13 in the illustrated embodiment.

*Translatable member 10*

Translatable member 10 of the illustrated embodiment is a unitary structure comprising a valve head 14 generally resembling a pair of frustums having a common base, and having a ring-shaped outer portion 14a adapted to coact with valve seat 36 located at said common base. A pair of stems 15, 16 coaxial with valve head 14 protrudes therefrom in opposite directions. Stems 15 and 16 may be integral with valve head 14, as in the present embodiment, though nonintegral constructions may be employed.

In one nonintegral construction which may be employed to considerable advantage, the stems are formed at opposite ends of a stem unit which is separate from the valve head. The valve head is mounted upon the stem unit in such manner that its axis of symmetry is tiltable through a small angle with respect to the axis of symmetry of the stem unit in any plane containing the axis of symmetry of the stem unit. By thus making the valve head tiltable with respect to the stem unit a self-seating valve construction is provided, since the valve head is free to tilt slightly as it is urged into its closed position and thereby tightly engage the valve seat even though the plane of the valve seat is not strictly perpendicular to the axis of symmetry of the stem unit.

Returning to consideration of translatable member 10 of the illustrated embodiment, it may be seen (FIGURE 3) that stem 16 is of hexagonal cross section. In general, however, stem 16 may be of any noncircular cross section, the term "noncircular" as used herein including cross sections which are otherwise circular but are equipped with splines, longitudinal slots, or the like.

Figures 2, 3:
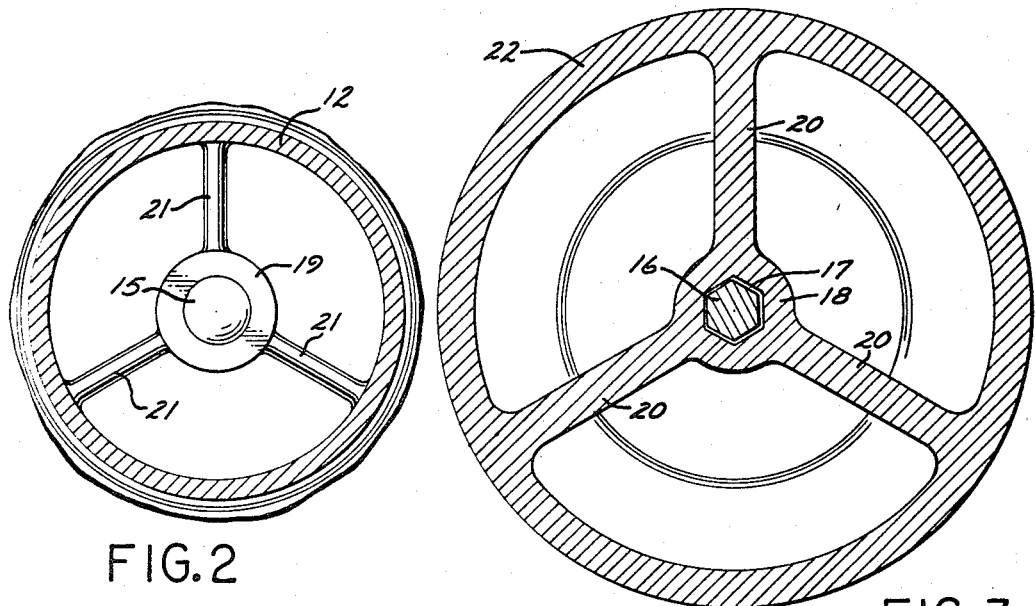
FIGURE 2 is a partial cross-sectional view taken on line 2—2 of FIGURE 1.
FIGURE 3 is a partial cross-sectional view taken on line 3—3 of FIGURE 1.

As best seen in FIGURE 3, stem 16 is fitted into hexagonal bore 17 in guide 18, which is integrally connected with valve body 22 by means of arms 20. Thus, since stem 16 and bore 17 are of congruous, noncircular cross section, translatable member 10 is constrained to assume the same angular position about the axis of symmetry of the valve as valve body 22, i.e., is coupled to valve body 22 for joint rotation therewith. Additionally, since the fit between stem 16 and bore 17 is a sliding, or loose, fit, translatable member 10 is translatable along the axis of symmetry of the valve.

While bore 17 of the illustrated embodiment is of hexagonal cross section, it may generally be of the same cross section as stem 16 but slightly larger, or of any other cross section which will so engage stem 16 as to angularly interlock translatable member 10 with valve body 22.

Exteriorly threaded stem 15 is interthreaded with the interior threads of nut 19. Nut 19 is supported along the axis of conduit 12 and affixed to conduit 12 against angular rotation about its axis by means of a spider comprised of arms 21 (FIGURE 2). Thus, as may be seen in FIGURE 1, rotation of translatable member 10 with respect to conduit 12 will necessarily result in translation of translatable member 10 with respect to conduit 12 and valve seat 36.

Considering now the coaction of stems 15 and 16 of translatable member 10 with relation to each other and also with relation to the other parts of the valve, it will be seen that translation of the valve head 14 with respect to valve seat 36 occurs whenever valve body 22 is rotated about the axis of symmetry of the valve relative to conduit 12. That is, rotation of valve body 22 rotates translatable member 10 because they are interlocked by stem 16 and bore 17, but rotation of translatable member 10 with respect to conduit 12 causes translatable member 10 to be translated by the threads of stem 15 and nut 19, as explained above, and thus rotation of valve body 22 with respect to conduit 12 necessarily causes translation of translatable member 10 with respect to valve seat 36.

Translatory motion of translatable member 10 will be accompanied by rotation of translatable member 10 with respect to conduit 12. However, there will be no relative angular motion between valve head 14 and valve seat 36, since valve seat 36 is affixed to valve body 22 and translatable member 10 is angularly interlocked, or coupled, with valve body 22 by means of noncircular stem 16, noncircular bore 17 in guide 18, and a spider comprised of arms 20, as hereinabove described. While affixing the valve seat to the valve body as exemplified in the illustrated embodiment provides the advantage that there is no relative angular movement between the valve head and the valve seat, thereby reducing wear and operating torque, the invention is not limited to arrangements in which the valve seat is affixed to the valve body.

Actuator assembly 11

Actuator assembly 11 includes valve body 22 and its integral parts located within it, mounting flange 23, valve seat ring 24, bolts 25, O-rings 26, bearings 28 and 30, joint seals 33 and 34, and bearing seals 32 and 35.

Valve body 22 is of generally cylindrical configuration, being open at the end adjacent mounting flange 23 and having a smaller opening at the end adjacent conduit 13 to which bearing 30 is affixed. Conduit 13 is journaled in bearing 30 by means of balls 31 in suitable races. Bearing 30 is provided with seals 34 and 35 whereby a sealed, rotatable joint is provided between valve body 22 and conduit 13.

Figure 4:
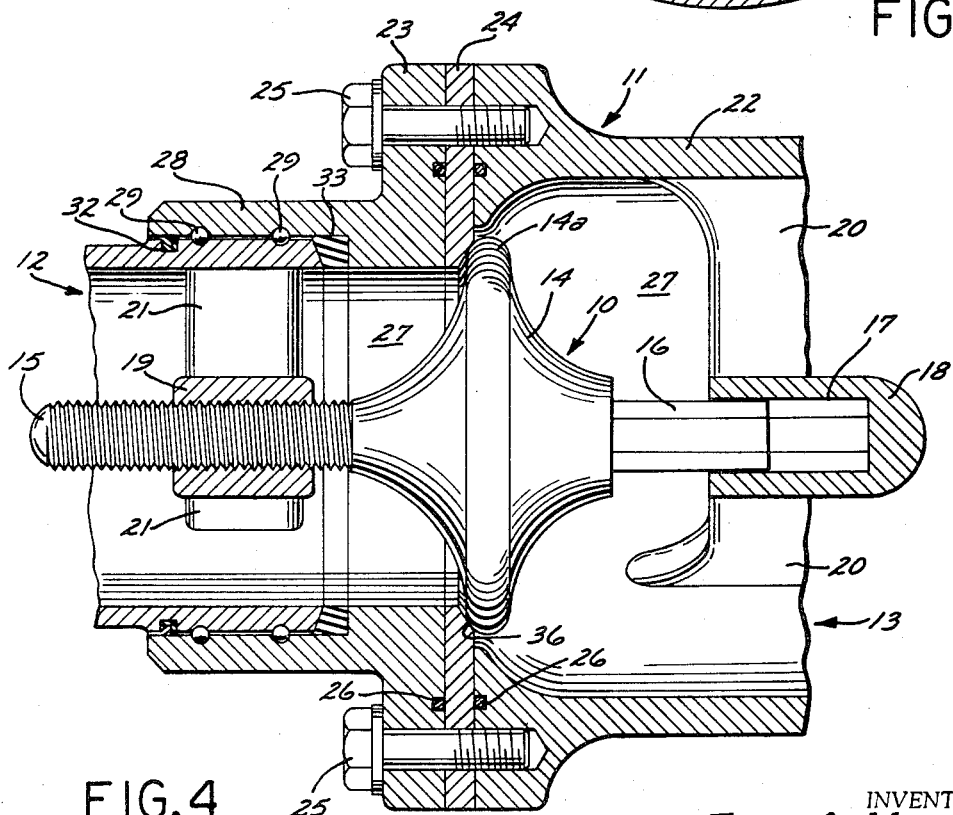
FIGURE 4 is a longitudinal sectional view showing the valve in its closed state.

Guide 18 is axially suspended within valve body 22 by means of a spider comprised of arms 20 (FIGURE 4). Guide 18 and arms 20 are integral with valve body 22 in the illustrated embodiment.

Valve seat ring 24 is adapted to be mounted between valve body 22 and mounting flange 23 by means of bolts 25 and to be fluid-tightly sealed to valve body 22 and mounting flange 23 by means of O-rings 26. Valve seat ring 24 is chamfered at its inner diameter to provide a valve seat 36 adapted to coact with ring-shaped outer portion 14a of valve head 14 when outer portion 14a is urged into contact with it. Valve seat ring 24 is composed of material selected to efficiently cooperate with outer portion 14a of valve head 14 to produce a tight seal therebetween. Other arrangements of valve seat ring 24, e.g., an arrangement adapted to mount a separate valve seat body, rather than employing the simple chamfer 36, may be employed within the scope of the invention.

As may best be seen in FIGURE 1, a fluid-conveying passage 27 extends completely through actuator assembly 11. Guide 18 is mounted within passage 27 by arms 20. Translatable member 10 is held in passage 27 by guide 18 and nut 19.

A bearing 28 is mounted on mounting flange 23. Bearing 28 is provided with seals 32 and 33 whereby a sealed rotatable joint is provided between mounting flange 23 and conduit 12.

Thus it may be seen in FIGURE 1 that actuator assembly 11 generally comprises a valve body 22, a mounting flange 23, the bearing and seals by which conduits 12 and 13 are joined to them, and guide 18 which is supported coaxially and nonrotatably in passage 27.

Conduit 12

Conduit 12 is provided at its right-hand end with raceways for balls 29, a suitable groove for bearing seal 32, and a lip for retaining joint seal 33. Nut 19 is coaxially mounted within the right-hand end of conduit 12, and held nonrotatable with respect thereto by means of a spider comprised of arms 21 (FIGURE 2). Nut 19 is interiorly threaded with threads adapted to engage the exterior threads of stem 15 of translatable member 10, whereby translatable member 10 may be translated by rotating it with respect to conduit 12.

Conduit 13

Conduit 13 is provided at its left-hand end with raceways for balls 31, a suitable groove for bearing seal 35, and a lip for retaining joint seal 34.

Specific details of the bearings and seals between valve body 22, mounting flange 23, and conduits 12 and 13 are not shown herein, e.g., details of raceway construction, bearing retainers, packing retainers, etc., since such features of design are not part of the present invention. It should be particularly noted, however, that the bearings by which the two conduits are journaled in the valve body and the mounting flange may be any bearings of the class generally known as anti-friction bearings, and are not limited to the ball bearings shown by way of example in the illustrated embodiment. Thus, ball bearings 28 and 30 of the illustrated embodiment may be replaced with needle bearings, roller bearings, or other anti-friction bearings. Bearings 28 and 30, either or both of them, may be replaced with certain types of antifriction bearings combining to some extent the functions of journal bearings and thrust bearings, e.g., certain types of tapered roller bearings. Also, while the bearing interposed between the valve body and mounting flange and the conduits should be as free as possible to minimize valve operating torque, these bearings may in certain applications of the invention be preloaded to reduce runout, wear, etc., especially bearing 28 by which conduit 12 is journaled in mounting flange 23. While, as may be seen in FIGURE 1, the fluid in the valve is maintained against leakage through the joints between the conduits and the valve body and mounting flange principally by joint seals 33 and 34, bearing seals 32 and 35 may also serve this function to some extent, particularly when certain types of immersible bearings are employed.

The valve assembled

Having considered the various major components of the valve of this invention, viz., translatable member 10, actuator assembly 11, and conduits 12, 13, the manner in which these major components are interconnected to provide a compact valve having desirably low operating torque and also serving as a swivel joint may be understood by reference to FIGURE 1. As shown in FIGURE 1, the interior of conduit 12 is in communication with the interior of conduit 13, when the valve is open, by way of passage 27 extending completely through actuator assembly 11 from conduit 12 to conduit 13. As best shown in FIGURE 2, arms 21 of the spider which supports nut 19 in the end of conduit 12 occupy only a small part of the cross section of conduit 12 and, consequently, impede the flow of fluid through conduit 12 and passage 27 to a limited extent only. Similarly, as may best be seen in FIGURE 3, the arms 20 of the spider which supports guide 18 within valve body 22 occupy only a small part of the cross section of passage 27 and, consequently, impede the flow of fluid through passage 27 to a limited extent only.

Since all flow through the valve takes place through passage 27, it may be seen in FIGURE 1 that the valve of the invention will be in its fully open condition when translatable member 10 has been so translated that valve head 14 is at its maximum possible distance from valve seat 36, i.e., when stem 16 is interengaged with bore 17 to the maximum extent permitted by the construction of the valve. As seen in FIGURE 1, the maximum travel of translatable member 10 in the valve open direction is limited in the illustrated embodiment by contact between the right-hand frustum-shaped portion of valve head 14 and the guide 18.

Referring to FIGURE 4, and keeping in mind that all flow through the valve must take place through passage 27 of actuator assembly 11, it may be seen that the valve of the invention is in its closed condition when movable member 10 has been translated to the position at which valve head portion 14a is in contact with valve seat 36.

While the outer ring-shaped portion of valve head 14 which contacts valve seat 36 and thereby closes the valve is shown in the illustrated embodiment as being an integral part of the valve head, it may be replaced with a separate member mounted upon the valve head and adapted to coact with valve seat 36 to close the valve. This separate member may be fabricated of a material better suited to coact sealingly with valve seat 36, e.g., by reason of its resilience, or may be of a shape which would be uneconomical or difficult to fabricate integrally with valve head 14, all within the scope of the invention.

*Operation of the illustrated embodiment*

As explained hereinabove, the valve of the invention is open when, as shown in FIGURE 1, translatable member 10 is so positioned that valve head 14 is as far as possible from valve seat 36. The valve of the invention is closed when, as shown in FIGURE 4, translatable member 10 is so positioned that the ring-shaped outer portion 14a of valve head 14 is urged against valve seat 36. Intermediate stages of opening of the valve of the invention may, of course, be brought about by positioning translatable member 10 at corresponding intermediate stages of its travel.

As also discussed hereinabove, translatable member 10 is caused to translate by relative rotation between conduit 12 and valve body 22. Thus, since the valve is opened or closed by translation of translatable member 10, it may be seen that the valve may be actuated into its open, closed, or intermediate states by rotation of the valve body with respect to conduit 12, or by rotation of conduit 12 with respect to the valve body.

That is to say, there are two principal modes of actuation of the valve of the invention.

In the first principal mode of actuation conduit 12 is fixed against rotation about its own axis and valve body 22 rotated, thereby opening the valve in one direction of rotation and closing the valve in the other direction of rotation of the valve body. In the second principal mode of actuation valve body 22 is held fixed against rotation about its own axis and conduit 12 is rotated, opening the valve in a first direction of rotation and closing the valve in a second direction of rotation of conduit 12.

Both of these principal modes of valve actuation will be found to be useful in certain applications of the invention. For instance, the first mode will be of use in applications where the valve of the invention is employed in fixed installations, such as water lines, fuel lines, etc. The second mode will be useful, for instance, in applications wherein the valve of the invention is inserted in temporary or portable conduits and the conduits supported at least in part by the valves, such as in missile fuel-feed systems, water-supply lines between pumper fire trucks and monitors, and the loading of liquids onto or removal of liquids from ships, barges and the like.

In addition to the two principal modes of actuation of the valve of the invention described above, there also exists a third, hybrid mode of actuation wherein both conduit 12 and actuator assembly 11 are rotated. This hybrid mode of operation enjoys the advantage in some applications that the flow through the valve is related to two variables, viz., the extent of rotation of conduit 12 and the extent of rotation of actuator assembly 11. Thus, the amount of flow through the valve may be related to the difference between the amount of rotation imparted to conduit 12 and the amount of rotation imparted to actuator assembly 11. On the other hand, control torques may be imparted as a regular practice only to actuator assembly 11, the second variable, i.e., rotation of conduit 12, being reserved for emergency closure of the valve as a safety measure. Such applications might include, for instance, systems for the handling of flammable or explosive fluids.

*Swivel action*

As may be seen from FIGURE 1, the valve of the invention is not limited to applications wherein conduits 12 and 13 must be angularly fixed with respect to each other about the axis of symmetry of the valve. Rather the valve of the present invention is particularly adapted to act not only as a valve but also as a swivel joint in applications requiring swiveling action, i.e., relative angular motion between conduits 12 and 13 about the axis of symmetry of the valve. As also seen in FIGURE 1, however, swiveling of one of the conduits with respect to the other must take place at the joint between conduit 13 and valve body 22 in order to avoid concomitant actuation of the valve, since, as pointed out hereinabove, rotation at the joint between conduit 12 and the valve body results in actuation of the valve.

As used herein, the terms "translatory," "translation," and the like, denote not only pure translatory motion in the narrowest sense of that term, but also composite motions of which pure translatory motion is one component; an example of such a composite motion being the motion of a body such as translatable member 10 herein, which rotates about an axis while at the same time moving along said axis.

As used herein, the terms "angularly interlocked," and the like, signify that the members to which they are applied are constrained to assume substantially the same angular position about an axis, and include within their scope those members which are thus constrained but are translatable along said axis with respect to each other.

The foregoing detailed description is to be clearly understood as given by way of illustration and example only, the spirit and scope of this invention being limited solely by the appended claims.

What is claimed is:
1. A valve, comprising:
   valve head means,
   valve seat means adapted to coact with said valve head means to vary the flow of fluid through the valve when said valve head means is shifted with respect thereto,
   a plurality of fluid-conveying means rotatable relative to each other,
      said fluid-conveying means including first conduit means and second conduit means, said fluid-conveying means further including hollow valve-actuator means communicating between said first conduit means and said second conduit means,
   coupling means coupling said valve head means and one of said fluid-conveying means for conjoint rotation, and for translation of said head means relative to said one of said fluid conveying means, and
   means affixed to another of said fluid-conveying means and cooperating with second means fixed to said valve head means to translate said valve head means in response to rotation thereof with respect to said another of said fluid-conveying means,
      whereby the flow of fluid through said valve may be varied by rotating said one of said fluid-conveying means with respect to said another of said fluid-conveying means.

2. A valve as claimed in claim 1 in which antifriction bearing means and fluid-tight sealing means are interposed between said fluid-conveying means.

3. A valve as claimed in claim 1 in which said valve seat means is affixed to said one of said fluid-conveying means.

4. A valve as claimed in claim 3 in which antifriction bearing means and fluid-tight sealing means are interposed between said fluid-conveying means.

5. A valve as claimed in claim 3 in which said coupling means includes guide means fixed within said one of said fluid-conveying means and having a noncircular bore, and a noncircular stem affixed to said valve head means, said noncircular bore and said noncircular stem being interengaged to angularly lock said valve head means to said one of said fluid-conveying means for conjoint rotation with respect to another of said fluid-conveying means 6. A valve as claimed in claim 5 in which antifriction bearing means and fluid-tight sealing means are interposed between said fluid-conveying means.

7. A valve, comprising:
translatable means, including:
a threaded stem,
a noncircular stem,
and a valve head coaxial with said stems and angularly fixed with respect thereto,
valve-actuator means having a passage extending axially therethrough from end to end,
said valve-actuator means also having a valve seat formed therein in the wall of said passage,
said valve-actuator means further having guide means affixed within said passage,
said guide means having a noncircular bore adapted to receive the noncircular stem of said translatable means, thus interlocking said valve-actuator means and said translatable means for conjoint rotation while permitting relative axial shifting therebetween,
first conduit means communicating coaxially with one end of said passage through a rotary joint including antifriction bearing means and fluid-tight sealing means,
nut means fixed in said first conduit measn, said nut means having interior threads adapted to coact with said threaded stem to translate
said translatable member with respect to said valve seat when said translatable member is rotated, and
second conduit means communicating coaxially with the other end of said passage through a rotary joint including antifriction bearing means and fluid-tight sealing means,
whereby the flow of fluid through said valve may be varied by rotating said valve-actuator means with respect to said first conduit means.

References Cited
UNITED STATES PATENTS

| | | | |
|---|---|---|---|
| 903,451 | 11/1908 | Clark | 251—340 |
| 1,340,107 | 5/1920 | Blache | 251—344 |
| 2,215,375 | 9/1940 | Ortman | 251—340 |
| 2,985,425 | 5/1961 | Tang | 251—340 |
| 3,043,558 | 7/1962 | Napier | 251—340 |
| 3,321,177 | 5/1967 | Fendel et al. | 251—347 |

SAMUEL SCOTT, *Primary Examiner.*